US009423863B2

(12) United States Patent
Hsieh

(10) Patent No.: US 9,423,863 B2
(45) Date of Patent: Aug. 23, 2016

(54) SERVER SYSTEM WITH POWER DISTRIBUTION BOARD AND STORAGE CONTROL METHOD THEREOF

(71) Applicant: Wistron Corporation, New Taipei (TW)

(72) Inventor: Cheng-Kuang Hsieh, New Taipei (TW)

(73) Assignee: Wistron Corporation, New Taipei (TW)

( * ) Notice: Subject to any disclaimer, the term of this patent is extended or adjusted under 35 U.S.C. 154(b) by 177 days.

(21) Appl. No.: 14/537,912

(22) Filed: Nov. 11, 2014

(65) Prior Publication Data

US 2016/0098074 A1    Apr. 7, 2016

(30) Foreign Application Priority Data

Oct. 2, 2014  (TW) .............................. 103134379 A

(51) Int. Cl.
  *G06F 1/32* (2006.01)
  *H04L 29/08* (2006.01)
  *G06F 3/06* (2006.01)

(52) U.S. Cl.
  CPC ............ *G06F 1/3268* (2013.01); *G06F 1/3206* (2013.01); *G06F 3/0625* (2013.01); *H04L 67/1097* (2013.01)

(58) Field of Classification Search
  CPC .............................. G06F 1/3268; G06F 3/0625
  See application file for complete search history.

(56) References Cited

U.S. PATENT DOCUMENTS

2010/0005329 A1* 1/2010 Innan .................... G06F 1/3203
                                                            713/324
2012/0327591 A1  12/2012 Jau et al.
2013/0119764 A1   5/2013 Hsu et al.
2013/0179718 A1   7/2013 Jau et al.
2013/0339786 A1* 12/2013 Samanta ............. G06F 11/1666
                                                            714/6.23

FOREIGN PATENT DOCUMENTS

TW    201319791    5/2013
TW    201329690    7/2013
TW    I411375     10/2013

OTHER PUBLICATIONS

"Office Action of Taiwan Counterpart Application" with English translation, issued on Oct. 15, 2015, p. 1-p. 10.

* cited by examiner

*Primary Examiner* — Albert Wang
(74) *Attorney, Agent, or Firm* — Jianq Chyun IP Office

(57) ABSTRACT

A server system and a control method thereof are provided. The server system includes a first computing module, a power distribution board (PDB) module, a first storage apparatus, and a second storage apparatus. The PDB module is connected to the first computing module and is configured to distribute the power of the server system. The first storage apparatus and the second storage apparatus are connected to the PDB module. After finishing a boot operation, the first computing module determines whether a second computing module connected to the PDB module is present, such that the first computing module controls the PDB module to select and distribute the first storage apparatus and the second storage apparatus to the first computing module and the second computing module. Therefore, the server system can achieve different data access applications in the server system by only using a general-purpose PDB module.

10 Claims, 9 Drawing Sheets

SERVER SYSTEM WITH POWER DISTRIBUTION BOARD AND STORAGE CONTROL METHOD THEREOF

CROSS-REFERENCE TO RELATED APPLICATION

This application claims the priority benefit of Taiwan application serial no. 103134379, filed on Oct. 2, 2014. The entirety of the above-mentioned patent application is hereby incorporated by reference herein and made a part of this specification.

BACKGROUND OF THE INVENTION

1. Field of the Invention

The invention relates to a server system, and more particularly, to a server system and a control method thereof.

2. Description of Related Art

In recent years, as technology advances, the explosive growth of data volume has affected the purchasing demand of the technology industry for hardware. Since many non-volatile storage devices are needed to store large amount of data, how to effectively store the data and achieve power-saving effect at the same time has always been an important object for a server system (or referred to as data center) configured to store large data.

In general, the server system storing data can be divided into the two main applications of "hot storage" and "cold storage." "Hot storage" refers to an access application performed on data that is often accessed within a period of time (such as data that is often accessed within six months). "Hot storage" generally needs a plurality of computing modules to rapidly perform access and management on a non-volatile storage device via a sufficient number of data transmission bandwidths at the same time. In contrast, "cold storage" refers to an access application preformed on data that is not often accessed after a period of time (such as data that is not often accessed after six months). Since the probability of data access is lower, "cold storage" generally only needs a few computing modules to support a large amount of non-volatile storage apparatuses so as to meet the need of accessing large amount of data.

Since the hardware equipment needed for "hot storage" and "cold storage" are not completely the same, two different server systems and power distribution boards therein generally need to be designed for different applications.

SUMMARY OF THE INVENTION

The invention provides a server system and a control method for the server system capable of achieving different data access applications in the server system by only using a general-purpose power distribution board (PDB) module.

An exemplary embodiment of the invention provides a server system including a first computing module, a PDB module, a first storage apparatus, and a second storage apparatus. The first computing module contains a processing unit. The PDB module is connected to the first computing module and is configured to distribute the power of the server system. The first storage apparatus is connected to the PDB module. The second storage apparatus is connected to the PDB module. After finishing a boot operation, the first computing module determines whether a second computing module connected to the PDB module is present, such that the first computing module controls the PDB module to select and distribute the first storage apparatus and the second storage apparatus to the first computing module and the second computing module.

In an exemplary embodiment of the invention, in the operation in which the first computing module determines whether the second computing module connected to the PDB module is present, in the case that the second computing module connected to the PDB module is present, the first computing module controls the PDB module to distribute the first storage apparatus to the first computing module and distribute the second storage apparatus to the second computing module. Moreover, in the case that the second computing module connected to the PDB module is not present; the first computing module controls the PDB module to distribute the first storage apparatus and the second storage apparatus to the first computing module.

In an exemplary embodiment of the invention, when the first storage apparatus is distributed to the first computing module and the second storage apparatus is distributed to the second computing module, the first computing module transmits an idle control command to the first storage apparatus such that the first storage apparatus operates in an idle mode, and the second computing module transmits the idle control command to the second storage apparatus such that the second storage apparatus operates in the idle mode.

In an exemplary embodiment of the invention, the first storage apparatus and the second storage apparatus respectively have a plurality of storage media. When the first storage apparatus and the second storage apparatus are distributed to the first computing module, the first computing module transmits a standby control command to the first storage apparatus and the second storage apparatus such that a first storage medium in the storage media of the first storage apparatus operates in an idle mode and other storage media in the storage media of the first storage apparatus operate in a standby mode, and a second storage medium in the storage media of the second storage apparatus operates in the idle mode and other storage media in the storage media of the second storage apparatus operate in the standby mode. The first storage medium stores a directory information of the first storage apparatus and the second storage medium stores the directory information of the second storage apparatus, wherein the power consumption of the storage medium operating in the standby mode is less than the power consumption of the storage medium operating in the idle mode.

In an exemplary embodiment of the invention, the PDB module is connected to the first computing module via a first midplane board (MPB) module, and the PDB module is connected to the second computing module via a second MPB module.

An exemplary embodiment of the invention provides a control method configured for a server system having a first storage apparatus, a second storage apparatus, a PDB module, and a first computing module. The control method includes the following steps.: determining whether a second computing module connected to the PDB module is present after finishing a boot operation; and controlling the PDB module to select and distribute the first storage apparatus and the second storage apparatus to the first computing module and the second computing module according to the result of determining whether the second computing module connected to the PDB module is present.

In an exemplary embodiment of the invention, the step of determining whether the second computing module connected to the PDB module is present includes: controlling the PDB module to distribute the first storage apparatus to the first computing module and distribute the second storage apparatus to the second computing module in the case that the second computing module connected to the PDB module is present. Moreover, in the case that the second computing module connected to the PDB module is not present; the PDB module is controlled to distribute the first storage apparatus and the second storage apparatus to the first computing module.

In an exemplary embodiment of the invention, after the first storage apparatus is distributed to the first computing module and the second storage apparatus is distributed to the second computing module, an idle control command is transmitted to the first storage apparatus and the second storage apparatus such that the first storage apparatus and the second storage apparatus operate in the idle mode.

In an exemplary embodiment of the invention, the first storage apparatus and the second storage apparatus respectively have a plurality of storage media. After the first storage apparatus and the second storage apparatus are distributed to the first computing module, a standby control command is transmitted to the first storage apparatus and the second storage apparatus such that a first storage medium in the storage media of the first storage apparatus operates in an idle mode and other storage media in the storage media of the first storage apparatus operate in a standby mode, and a second storage medium in the storage media of the second storage apparatus operates in the idle mode and other storage media in the storage media of the second storage apparatus operate in the standby mode.

In an exemplary embodiment of the invention, the first storage medium stores a directory information of the first storage apparatus and the second storage medium stores the directory information of the second storage apparatus. The power consumption of the storage medium operating in the standby mode is less than the power consumption of the storage medium operating in the idle mode.

Based on the above, the server system and the control method for the server system provided in the invention do not need the use of two PDB modules to support two storage applications of the server system. Moreover, the server system can achieve different data access applications in the server system by only using a general-purpose PDB module, thereby saving the design, materials, and assembly cost related to the PDB module in the server system.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Detailed exemplary embodiments are disclosed in the present specification. However, specific structures and functional details disclosed in the present specification only represent the object of describing the exemplary embodiments. However, the exemplary embodiments can be embodied in many alternative fauns, and should not be considered to be limited to the embodiments described in the present specification.

In an exemplary embodiment of the invention, a server system is mainly configured to manage a large number of non-volatile data access operations of a storage apparatus, and the server can also be referred to as a data center. However, the server system of the embodiments of the invention can also be applied in other suitable fields and is not limited to the applications of the embodiments of the invention.

Since "hot storage" generally needs a plurality of computing modules to rapidly perform access and management on a non-volatile storage device via a sufficient number of data transmission bandwidths at the same time, each computing equipment in the server system often needs two or more than two computing modules and be used with a corresponding number of non-volatile storage apparatuses to build a server system specific to "hot storage." In contrast, "cold storage" generally only needs a few computing modules to support a large number of non-volatile storage devices, and therefore the server system specific to "cold storage" only needs a few or a single computing module to achieve the need of data access application. However, since both of the two data access applications need an exclusive power distribution board (PDB) module that is independently designed, the extensibility of application of the PDB modules is poor. Therefore, in the embodiments of the invention, in order to achieve different data access applications in the server system by using a general-purpose PDB module, a server system of a PDB module that can be used for both "hot storage" and "cold storage" is purposed.

Figure 1:
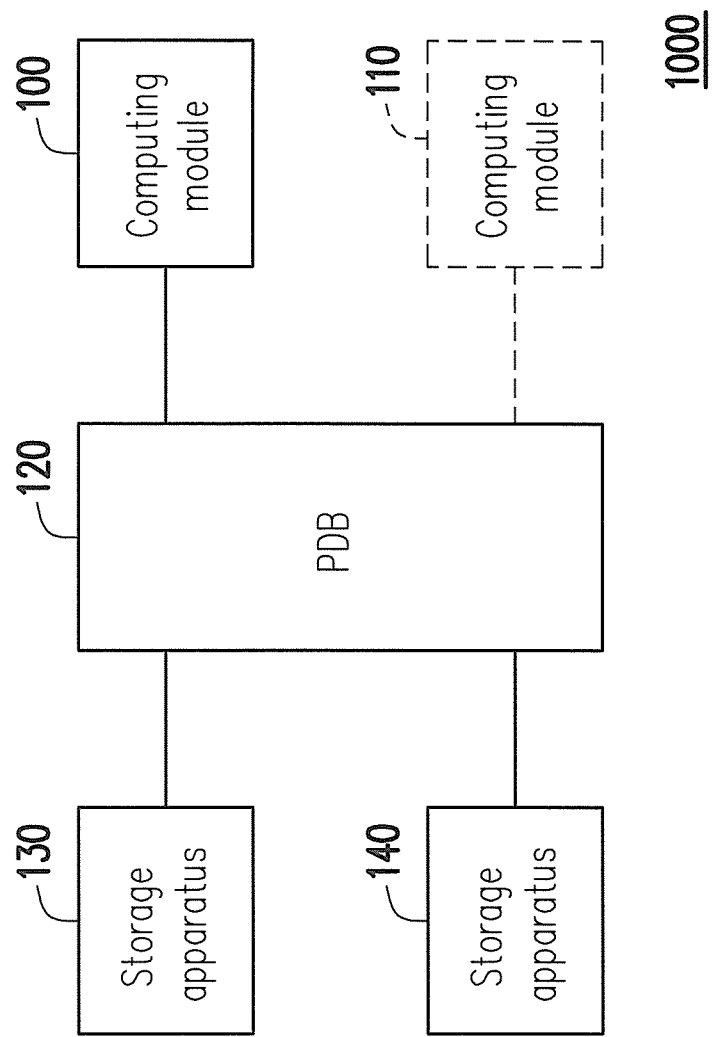
FIG. 1 is a schematic of a server system illustrated according to an exemplary embodiment.
Figure 2:
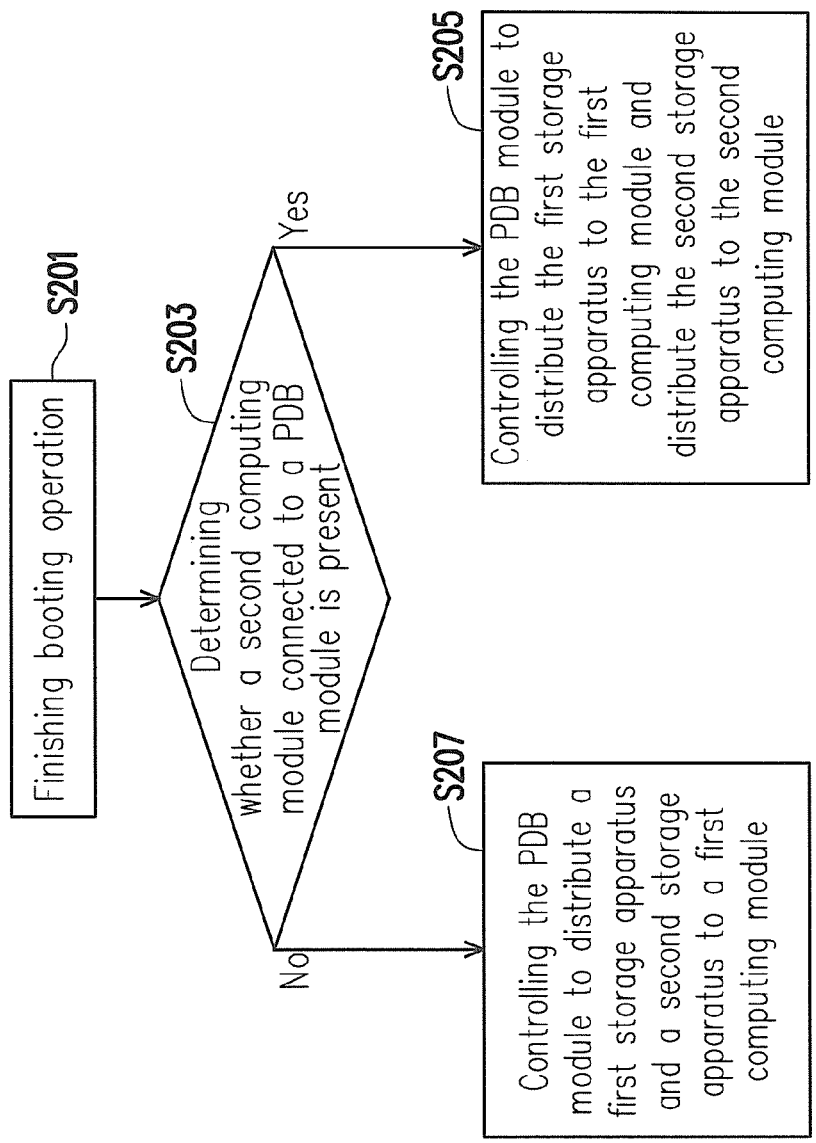
FIG. 2 is a flowchart of a control method illustrated according to an exemplary embodiment.

FIG. 1 is a schematic of a server system illustrated according to an exemplary embodiment, and FIG. 2 is a flowchart of a control method of a server system illustrated according to an exemplary embodiment. The main functions of the embodiments of the invention are described herein. Referring to FIG. 1 and FIG. 2, a server system 1000 includes a computing module 100 (also referred to as a first computing module), a computing module 110 (shown in a dotted line, also referred to as a second computing module) that can be optionally disposed, a PDB module 120, a storage apparatus 130 (also referred to as a first storage apparatus), and a storage apparatus 140 (also referred to as a second storage apparatus). In the present embodiment, two or more than two computing modules 100 and 110 can be disposed in the PDB module 120, and two or more than two storage apparatuses 130 and 140 can also be disposed. The embodiments of the invention do not limit that only two computing modules 100 and 110 and only two storage apparatuses 130 and 140 are disposed in the PDB module 120. After the first computing module 100 finishes a boot operation (S201), the computing module 100 determines whether the computing module 110 connected to the PDB module 120 is present (S203). For instance, the computing module 100 detects whether the PDB module 120 is connected to the computing module 110 via the PDB module 120. Moreover, in an exemplary embodiment, connection can further be directly established between the computing module 100 and the computing module 110 via a communication unit in the computing module 100, and the computing module 100 can receive a response information from the computing module 110, wherein the response information indicates whether the computing module 110 is connected to the PDB module 120.

In the case that the computing module 100 determines the computing module 110 connected to the PDB module 120 is present, the computing module 100 controls the PDB module 120 to distribute the storage apparatus 130 to the computing module 100 and distributes the storage apparatus 140 to the computing module 110 (S205). In the case that the computing module 100 determines the computing module 110 connected to the PDB module 120 is not present, the computing module 100 controls the PDB module 120 to distribute the storage apparatus 130 and the storage apparatus 140 to the computing module 100 (S207). In this way, the (main) computing module of the present server system can select and distribute a plurality of storage apparatuses to the computing module of the server system according to whether other computing modules using the same PDB module are present. Accordingly, the user can adjust the number of computing modules in the server system 1000 according to need. The server system 1000 suitably distributes the number of storage apparatuses that can be used or supported by each computing module based on the number of computing modules, such that the server system can be suitable for different data access applications, such as the applications of "hot storage" and "cold storage." The embodiments of the invention are further described via more detailed circuit structures and descriptions.

Figure 3:
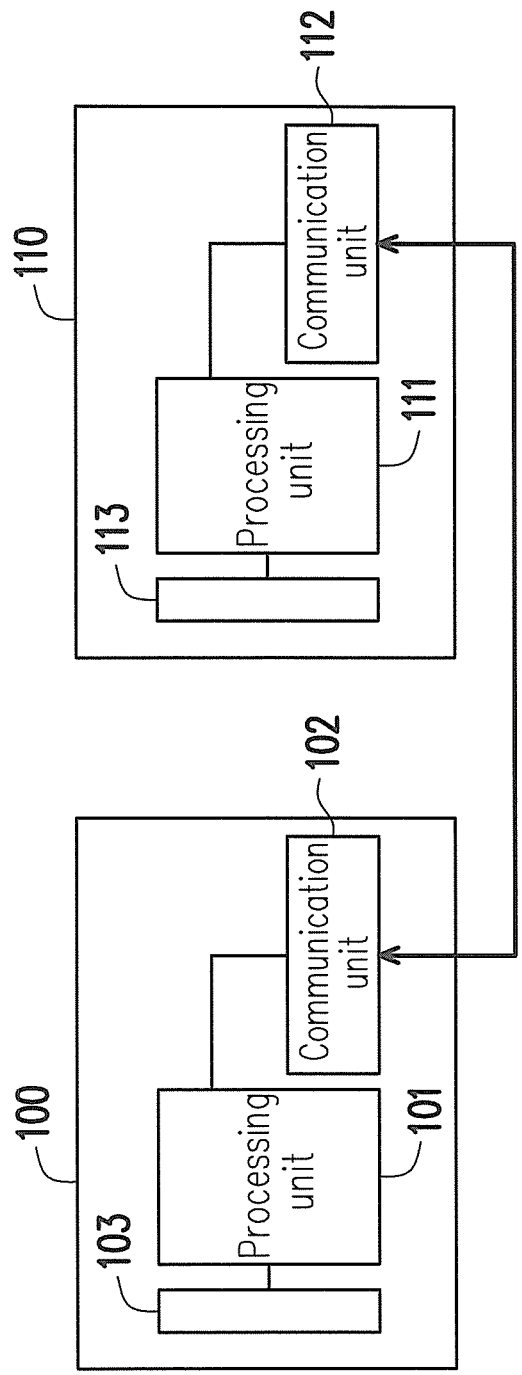
FIG. 3 is a block diagram of a computing module illustrated according to an exemplary embodiment.

FIG. 3 is a block diagram of a computing module illustrated according to an exemplary embodiment. In the present embodiment, the computing modules 100 and 110 have similar functions. For ease of explanation, the computing module 100 is used to representatively describe the function of each device in the computing modules 100 and 110. Referring to FIG. 1 and FIG. 3, the computing module 100 can include a processing unit 101, a communication unit 102, and a connection interface unit 103.

In the present exemplary embodiment, the computing module 100 is, for instance, a motherboard (MB) provided with a processing unit 101, a communication unit 102, and a connection interface unit 103. The computing module 100 is also referred to as a main computing module. The difference between the computing module 100 and other computing modules (such as computing module 110) is that the computing module 100 is also responsible for the management of the distribution of a plurality of storage apparatuses in the server system 1000. Specifically, the computing module 100 selects and distributes the storage apparatuses (such as storage apparatus 130 and storage apparatus 140) in the server system 1000 to one or a plurality of computing modules (such as computing module 100 and computing module 110) in the server system 1000 to perform management and access. Moreover, although not shown in FIG. 3, other peripheral circuit modules such as a memory module are disposed on the computing module 100 according to the setting of the manufacturer.

To allow the processing unit 101 manage the other circuit modules or perform data access on these other circuit modules, the processing unit 101 is a hardware (such as a chipset or a processor) having computing capability and configured to control the overall operation of the computing module 100. In the present exemplary embodiment, the processing unit 101 is, for instance, a central processing unit (CPU), a microprocessor or other programmable processing units, a digital signal processor (DSP), a programmable controller, an application-specific integrated circuit (ASIC), a programmable logic device (PLD), or other similar apparatuses. In the present exemplary embodiment, the processing unit 101 is a baseboard management controller (BMC), and in addition to managing the overall operation of the computing module 100, the processing unit 101 can also perform monitoring on information such as the operating conditions of the fan, the temperature, or the voltage in the server system 1000. In general, the processing unit 101 can be directly integrated on the substrate of the computing module 100 or be disposed in the computing module 100 in the form of a card.

The connection interface unit 103 is coupled to the processing unit 101 and the processing unit 101 can be connected to the PDB module 120 or other electronic apparatuses via the connection interface unit 103 to access data or issue a control command. In the present exemplary embodiment, the connection interface unit 103 is compatible with a physical interface of the Serial Attached SCSI (SAS) standard. For instance, the connection interface unit 103 can be a Mini SAS HD module. However, it should be understood that, the invention is not limited thereto, and the connection interface unit 103 can also be a physical interface satisfying the Two Wire Interface (TWI) standard, the Serial Advanced Technology Attachment (SATA) standard, the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the Integrated Device Electronics (IDE) standard, or other suitable standards, and the invention is not limited thereto. For instance, in another exemplary embodiment, the manufacturer can freely design the communication standard and the physical structure (such as the number of pins on the interfaces or the function provided by each pin) of the connection interface unit 103. Alternatively, the connection interface unit 103 is designed as a combination of physical interfaces satisfying the above standards (for instance, the connection interface unit 103 can be coupled to a slot satisfying the SAS standard and a slot satisfying the TWI standard) so as to achieve the object of the invention. The connection interface unit 103 can be sealed in a chip with the processing unit 101. Alternatively, the connection interface unit 103 is disposed outside of a chip containing the processing unit 101.

The communication unit 102 is coupled to the processing unit 101 and configured to process the communication between the computing module 100 and the computing module 110 in the server system 1000. In the present exemplary embodiment, the communication unit 102 is, for instance, a network interface card (NIC). Specifically, in the case that the communication unit 102 and the communication unit 112 are NICs and the two communication units are connected via a network cable, the processing unit 101 instructs the communication unit 102 to establish a network connection (such as a network connection satisfying the TCP/IP agreement) to the communication unit 112. The processing unit 101 can determine whether the computing module 110 and the PDB module 120 are connected to each other via the established network connection. For instance, the processing unit 101 can transmit an inquiry command to the processing unit 111 such that the processing unit 111 returns a response information to the processing unit 101, wherein the response information indicates whether the computing module 110 is connected to the PDB module 120.

It should be noted that, in the invention, the communication unit is not limited to an NIC. For instance, in another exemplary embodiment, the communication unit 102 can also be a physical interface compatible with the SAS standard, and is connected to another SAS via an SAS cable. Moreover, in the present exemplary embodiment, the computing module 100 determines whether the computing module 110 is connected to the PDB module 120 via the communication with the computing module 110. However, the invention is not limited thereto. For instance, in another exemplary embodiment, the computing module 100 can directly determine whether the PDB module 120 is connected to the computing module 110 by detecting the connection state of the PDB module 120, and does not need to determine whether the computing module 110 is connected to the PDB module 120 via a connection established between the communication unit 102 and the communication unit 112. For instance, the computing module 100 performs judgment according to a signal generated by a general-purpose input/output (GPIO) port of the PDB module 120. For instance, the GPIO port on the PDB module 120 generates different hardware signals according to whether the computing module 110 is plugged or unplugged, and the computing module 100 can determine whether the computing module 110 is connected to the PDB module 120 by detecting the hardware signal.

Figure 4:
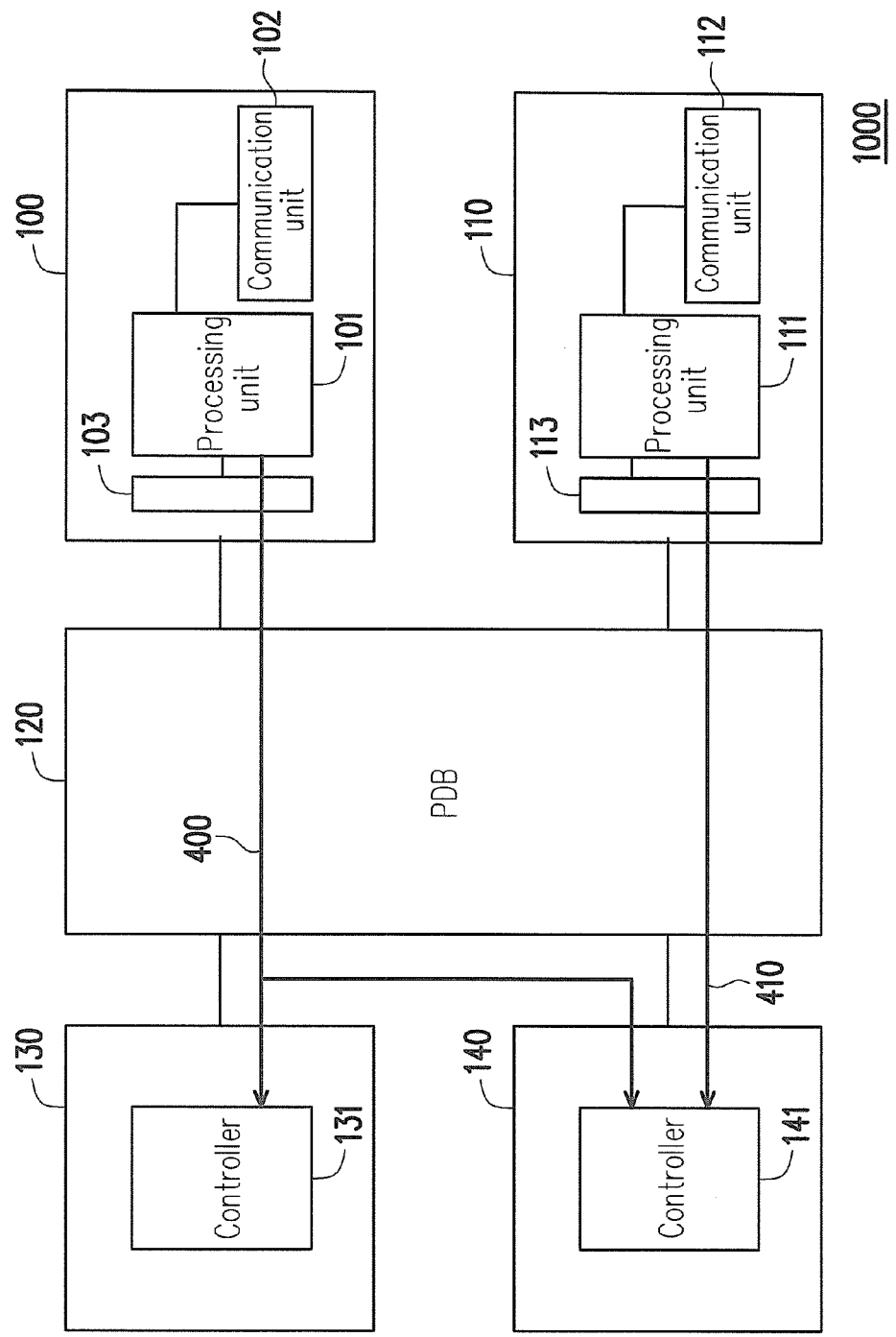
FIG. 4 is a schematic of a computing module issuing a control command illustrated according to an exemplary embodiment.

FIG. 4 is a schematic of a computing module issuing a control command illustrated according to an exemplary embodiment. Referring to FIG. 4, devices similar to those of FIG. 1 are described above and are not repeated herein. In FIG. 4, the storage apparatus 130 and the storage apparatus 140 have a controller 131 and a controller 141.

In the present exemplary embodiment, as shown in FIG. 4, the computing module 100 (main computing module) can issue a control command to the controller 131 and the controller 141 via a control path 400 to manage the storage apparatus 130 and the storage apparatus 140, wherein the control command is, for instance, a control command satisfying the TWI standard. In contrast, the computing module 110 (non-main computing module) can only issue a control command to the controller 141 via a control path 410. In other words, the computing module 100 can control the storage apparatus 130 and the storage apparatus 140, and the computing module 110 can only control the storage apparatus 140.

Specifically, in the case that the computing module 100 determines the computing module 110 connected to the PDB module 120 is present, the computing module 100 issues a control command (first control command hereinafter) to the controller 131 and the controller 141, wherein the first control command instructs that data access can be performed between the storage apparatus 130 and the computing module 100, and instructs that data access can be performed between the storage apparatus 140 and the computing module 110. In contrast, in the case that the computing module 100 determines the computing module 110 connected to the PDB module 120 is not present, the computing module 100 issues another control command (second control command hereinafter) to the controller 131 and the controller 141, wherein the second control command instructs that data access can be performed between the storage apparatus 130 and the computing module 100, and instructs that data access can be performed between the storage apparatus 140 and the computing module 100. Moreover, the issued command is not limited to the control command making the storage apparatus perform data access on the corresponding computing module. For instance, the command issued to the controller by the computing module can also be a write command or a read command, wherein the write command and the read command can include the physical address of the data to be accessed. In particular, the control command issued by the computing module 110 cannot be configured to distribute the storage apparatus 140. In other words, only the main computing module (such as computing module 100) can issue a control command configured to distribute the storage apparatus.

It should be mentioned that, in the present exemplary embodiment, the used control command is a control command satisfying the TWI standard, but the invention is not limited thereto. The control command can be a control command satisfying any standard designed according to manufacturer's needs.

Figure 5:
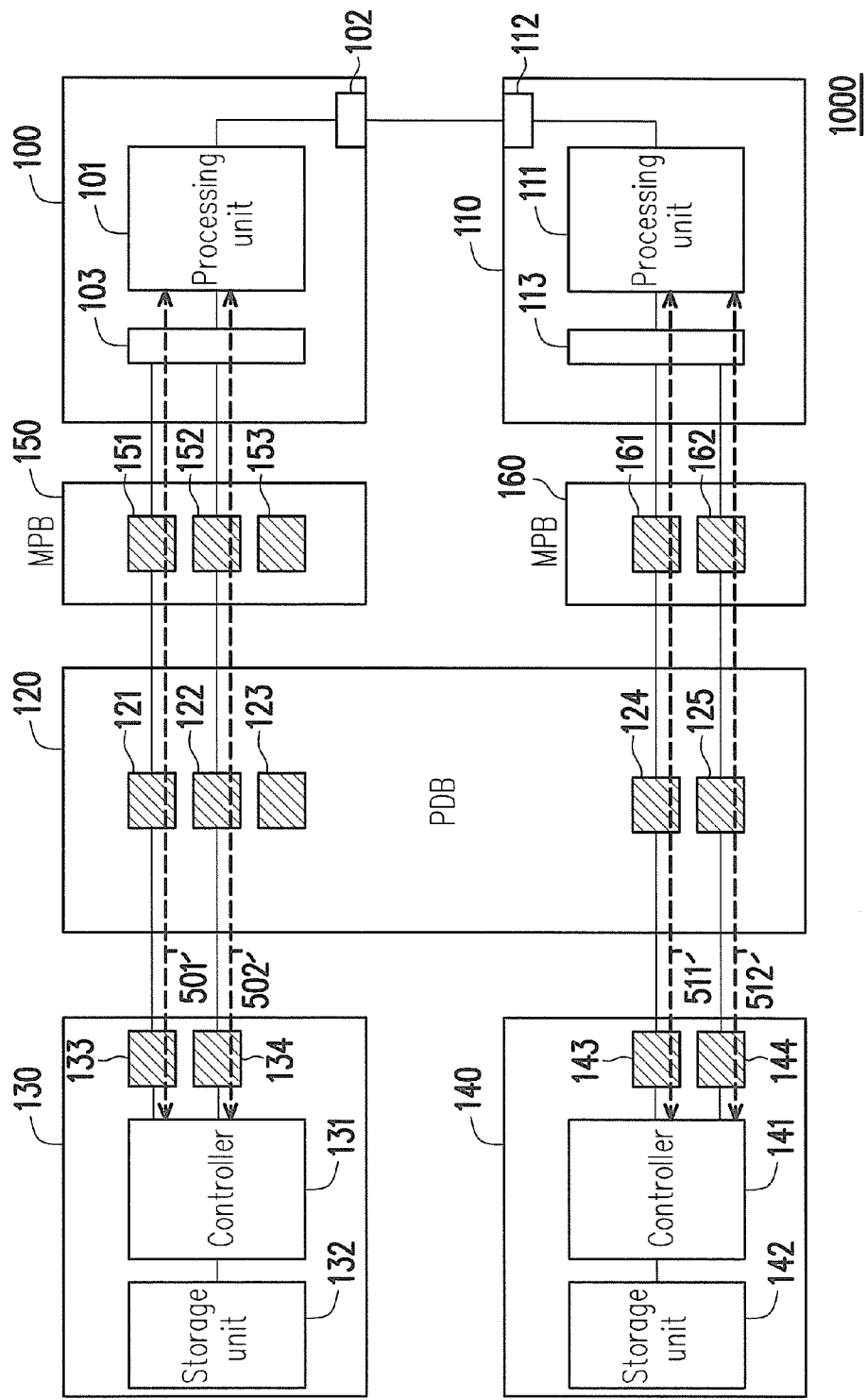
FIG. 5 to FIG. 6 are schematics of a server system and a data access path thereof illustrated according to an exemplary embodiment.
Figure 6:
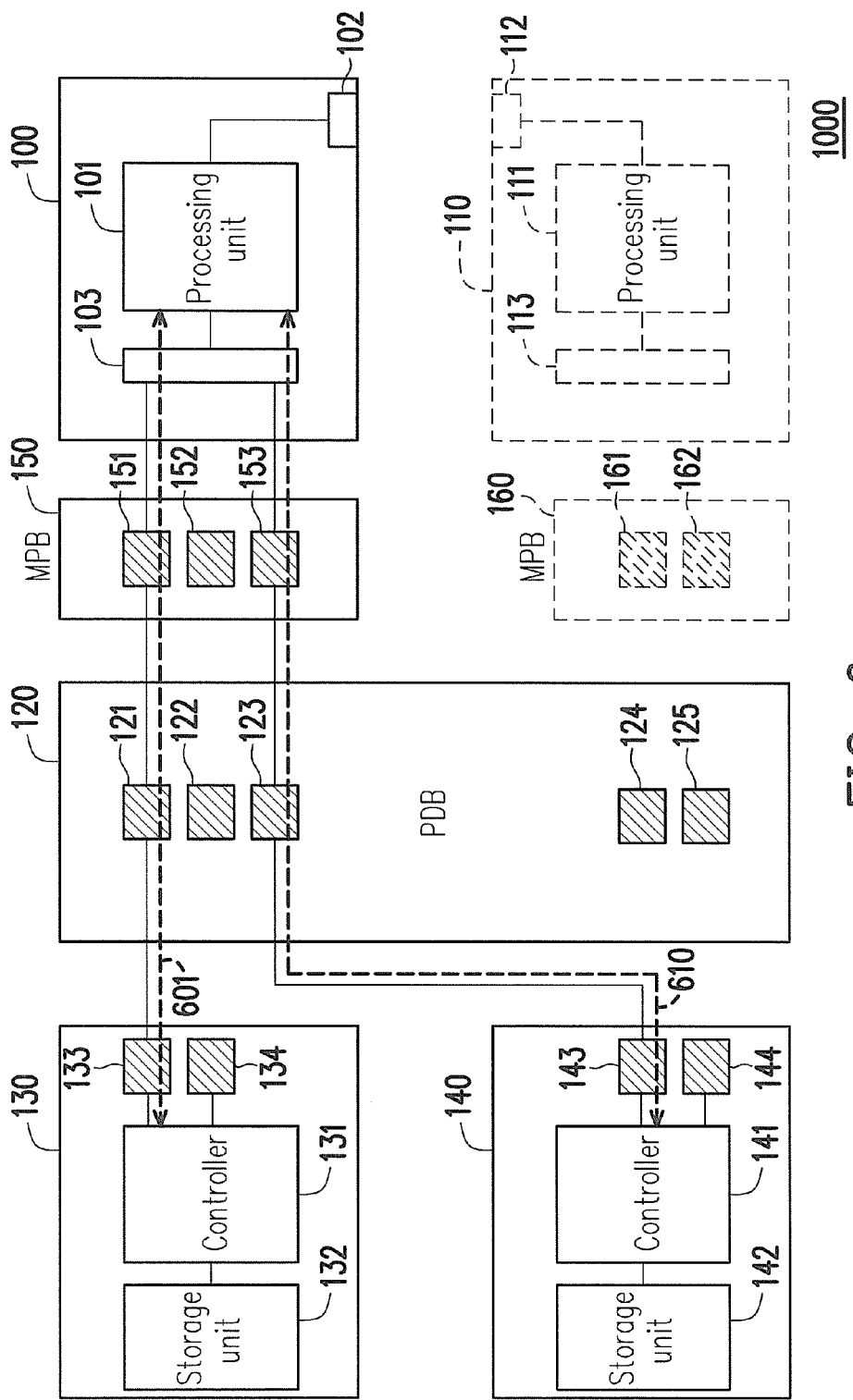

FIG. 5 to FIG. 6 are schematics of a server system and a data access path thereof illustrated according to an exemplary embodiment. In FIG. 5 and FIG. 6, a portion of the devices are as described above and are not repeated herein. Referring to FIG. 5, in the present exemplary embodiment, the server system 1000 includes a computing module 100, a computing module 110, a PDB module 120, a storage apparatus 130, a storage apparatus 140, an MPB module 150 (also referred to as first MPB), and an MPB module 160 (also referred to as second MPB).

The computing module 100 has a processing unit 101, a communication unit 102, and a connection interface unit 103. The computing module 110 has a processing unit 111, a communication unit 112, and a connection interface unit 113. The MPB module 150 has connection interface units 151, 152, and 153. The MPB module 160 has connection interface units 161 and 162. The storage apparatus 130 has a controller 131, a storage unit 132, a connection interface unit 133, and a connection interface unit 134. The storage apparatus 140 has a controller 141, a storage unit 142, a connection interface unit 143, and a connection interface unit 144. The PDB module 120 has connection interface units 121, 122, 123, 124, and 125.

In the present exemplary embodiment, the PDB module 120 is, for instance, a daughter board, and a power management module and a plurality of connection interface units are disposed on the daughter board. The power management module is connected to the processing unit 101 (or/and the processing unit 111 of the computing module 110) of the computing module 100, the storage apparatuses 130 and 140, and a plurality of power supply units. The power management module can distribute or control the power from the power supply units to each apparatus (such as storage apparatuses 130 and 140 and computing modules 100 and 110) in the server system 1000 according to a power control command issued by the processing unit 101 (or processing unit 111).

Before booting the server system 1000, as shown in FIG. 5, the user connects the connection interface unit 121 to the connection interface unit 151 and the connection interface unit 133; connects the connection interface unit 122 and the connection interface unit 152 to the connection interface unit 134; connects the connection interface unit 124 to the connection interface unit 161 and the connection interface unit 143; connects the connection interface unit 125 to the connection interface unit 162 and the connection interface unit 144; connects the connection interface units 151 and 152 to the connection interface unit 103; connects the connection interface units 161 and 162 to the connection interface unit 113; and connects the communication unit 102 to the communication unit 112. In the present exemplary embodiment, the computing module 100, the computing module 110, the PDB module 120, the storage apparatus 130, the storage apparatus 140, the MPB module 150, and the MPB module 160 can transmit data via the connected connection interface units.

It should be mentioned that, in the present exemplary embodiment, the connection interface units 103, 113, 121, 122, 123, 124, 125, 133, 134, 143, 144, 151, 152, 153, 161, and 162 (shown in diagonal grid) adopt a physical connection interface of a Mini SAS HD module supporting the SAS standard. As a result, the user uses an SAS cable to establish the connection between the connection interface units. However, the invention is not limited thereto. The user can adopt a suitable connection method to perform connection on the connection interface units to be connected via a suitable connection method according to the standards of the connection interface units. For instance, in the case that the connection interface units are physical connection interfaces satisfying the SATA standard, the user performs connection between the connection interface units by using a SATA connecting line satisfying the SATA standard.

In the present exemplary embodiment, the storage apparatus 130 and the storage apparatus 140 are just a bunch of disks (hereinafter JBOD) apparatuses. JBOD is an important storage apparatus in the storage field, and is only proposed by some manufacturers in recent years and is widely adopted. JBOD is a storage apparatus in which a plurality of storage media (such as hard disks) are installed on a drive plane board (DPB), and is generally abbreviated as Span. A data storage method thereof includes combining/spanning together several physical hard disks one by one, thereby providing a large logical sector. The data on JBOD is simply stored from the first hard disk, and after the storage space of the first hard disk is exhausted, data storage begins from the next disk in order. The access performance of JBOD is exactly the same as the access operation for a single hard disk, and only a method for the use of hard disk space is provided. The storage capacity of JBOD is equal to the sum of the capacity of all of the hard disks composing the JBOD storage apparatus, and does not have the function of the general so-called RAID disk array. However, the invention is not limited thereto, and the storage apparatuses 130 and 140 can also be other types of storage apparatuses. For instance, the storage apparatuses 130 and 140 can also be RAID disk array systems.

In the present exemplary embodiment, the storage unit 132 or the storage unit 142 is coupled to the controller 131 or the controller 141. As described above, the storage unit 132 or the storage unit 142 has a plurality of storage media configured to store data. The storage media can be any storage media suitable for the server system 1000 such as any type of hard disk drive (HDD), or non-volatile memory storage apparatus, or a combination of the storage media.

The controller 131 or the controller 141 is used to manage the operation of the storage apparatus 130 or the storage apparatus 140, and is configured to receive a control command from the computing module 100 or the computing module 110, read and transmit data to the computing module 100 or the computing module 110, or receive and store data from the computing module 100 or the computing module 110. In the present exemplary embodiment, the controllers 131 and 141 are, for instance, SAS Expanders, but the invention is not limited thereto. Manufacturers can freely design the type of the controller corresponding to the need of the storage apparatus.

In the present exemplary embodiment, the storage apparatus 130 (or storage apparatus 140) has 2 connection interface units, that is, connection interface unit 133 and connection interface unit 134 (or connection interface unit 143 and connection interface unit 144).

In another exemplary embodiment, the number of connection interface units of the storage apparatus 130 (or storage apparatus 140) corresponds to the maximum number of data channels that can be outputted by the storage apparatus 130 (or storage apparatus 140). In other words, the storage apparatus 130 (or storage apparatus 140) can at most use two channels to output data, wherein each channel is connected to one connection interface unit. It should be mentioned that, in the present exemplary embodiment, the maximum number of channels of the storage apparatus 130 (or the storage apparatus 140) is 2, but the invention is not limited thereto. For instance, the maximum number of channels of the storage apparatus 130 (or storage apparatus 140) is 3 or greater than 3, which is decided by the design of the manufacturer.

It should be mentioned that, the number of connection interface units in the PDB module 120 and the MPB modules 150 and 160 is also not limited to the number of connection interface units shown in FIG. 5. Similarly, the number of connection interface units in the PDB module 120 and the MPB modules 150 and 160 can also be decided according to the design of the manufacturer.

Referring to FIG. 2, FIG. 3, FIG. 4, and FIG. 5, when the computing module 100, as shown in the determination method of FIG. 2, determines the computing module 110 connected to the PDB module 120 is present via the link established between the communication unit 102 and the communication unit 112, the computing module 100 issues a control command to the storage apparatus 130 and the storage apparatus 140 via the control path 400. The control command instructs the storage apparatus 130 can perform data input and data output with the computing module 100 by using two channels via the connection interface units 133 and 134, and the control command also instructs the storage apparatus 140 can perform data input and data output with the computing module 110 by using two channels via the connection interface units 143 and 144. In other words, transmission of data is performed via data paths 501 and 502 between the computing module 100 and the storage apparatus 130, and transmission of data is performed via data paths 511 and 512 between the computing module 110 and the storage apparatus 140. The data path 501 (as shown in FIG. 5) represents the path in which data is transmitted between the connection interface units 133, 121, 151, and 103, the processing unit 101, and the controller 131. The data path 502, the data path 511, and the data path 512 follow the same principle. It should be mentioned that, the setting of the data paths is only exemplary and is not intended to limit the invention.

Specifically, in the case that the computing module 100 is to write a write data to the storage apparatus 130, the computing module 100 transmits the write data and a write command corresponding to the write data to the controller 131 via the data paths 501 and 502. After the controller 131 receives the write command and the write data, the controller stores the write data to a physical address indicated by the write command of the storage unit 132. In the case that the computing module 100 is to read a data stored in the storage unit 132, the computing module transmits a read command to the controller 131 via the data paths 501 and 502. When the controller 131 receives the read command, the controller 131 reads the data from the storage unit 132 according to the physical address indicated by the read command and transmits the read data to the computing module 100 via the data paths 501 and 502 to finish the write command. Similarly, data is also transmitted between the storage apparatus 140 and the computing module 110 via the data paths 511 and 512.

Since FIG. 6 is based on the devices of the server system 1000 of FIG. 5, the function of each device in FIG. 6 is not repeated herein. Moreover, the difference between FIG. 6 and FIG. 5 is in the different connection relationships between a plurality of connection interface units, and the computing module 110 and the MPB module 160 are not connected to the PDB module 120 (as shown in the dotted portion of FIG. 6). The differences are correspondingly described below.

Referring to FIG. 6, before booting the server system 1000, as shown in FIG. 6, the user connects the connection interface unit 121 to the connection interface unit 151 and the connection interface unit 133; connects the connection interface unit 123 to the connection interface unit 153 and the connection interface unit 143; and connects the connection interface units 151 and 153 to the connection interface unit 103. In the present exemplary embodiment, the computing module 100, the PDB module 120, the storage apparatus 130, the storage apparatus 140, and the MPB module 150 can transmit data via the connected connection interface units.

In the example of FIG. 6, the computing module 100 determines the computing module 110 connected to the PDB module 120 is not present. The computing module 100 is similar to the example in FIG. 5 and transmits another control command to the controllers 131 and 141 to distribute the storage apparatuses 130 and 140 to the computing module 100 and establish data paths 601 and 610. Therefore, the storage apparatus 130 performs transmission of data or command via the data path 601 and the computing module 100, and the storage apparatus 140 performs transmission of data or command via the data path 610 and the computing module 100. The detailed steps and method are described above and are not repeated herein.

It should be mentioned that, in the example of FIG. 6, the storage apparatus 130 and the storage apparatus 140 both transmit data via only one channel (i.e., via one connection interface unit 133 or connection interface unit 143). In other words, in the example of FIG. 6, the efficiency of data transmission of the storage apparatuses 130 and 140 is half that of the storage apparatuses 130 and 140 (two channels/connection interface units are used to transmit data) in FIG. 5.

In the examples of FIG. 5 and FIG. 6, the connection between the connection interface units is confirmed before booting the server system 1000 (for instance, a cable is first used to connect the connection interface units to be used), thereby manually switching the server system 1000. In the following, a method of how to automatically switch the server system 1000 by controlling the PDB module 120 is described.

Figure 7:
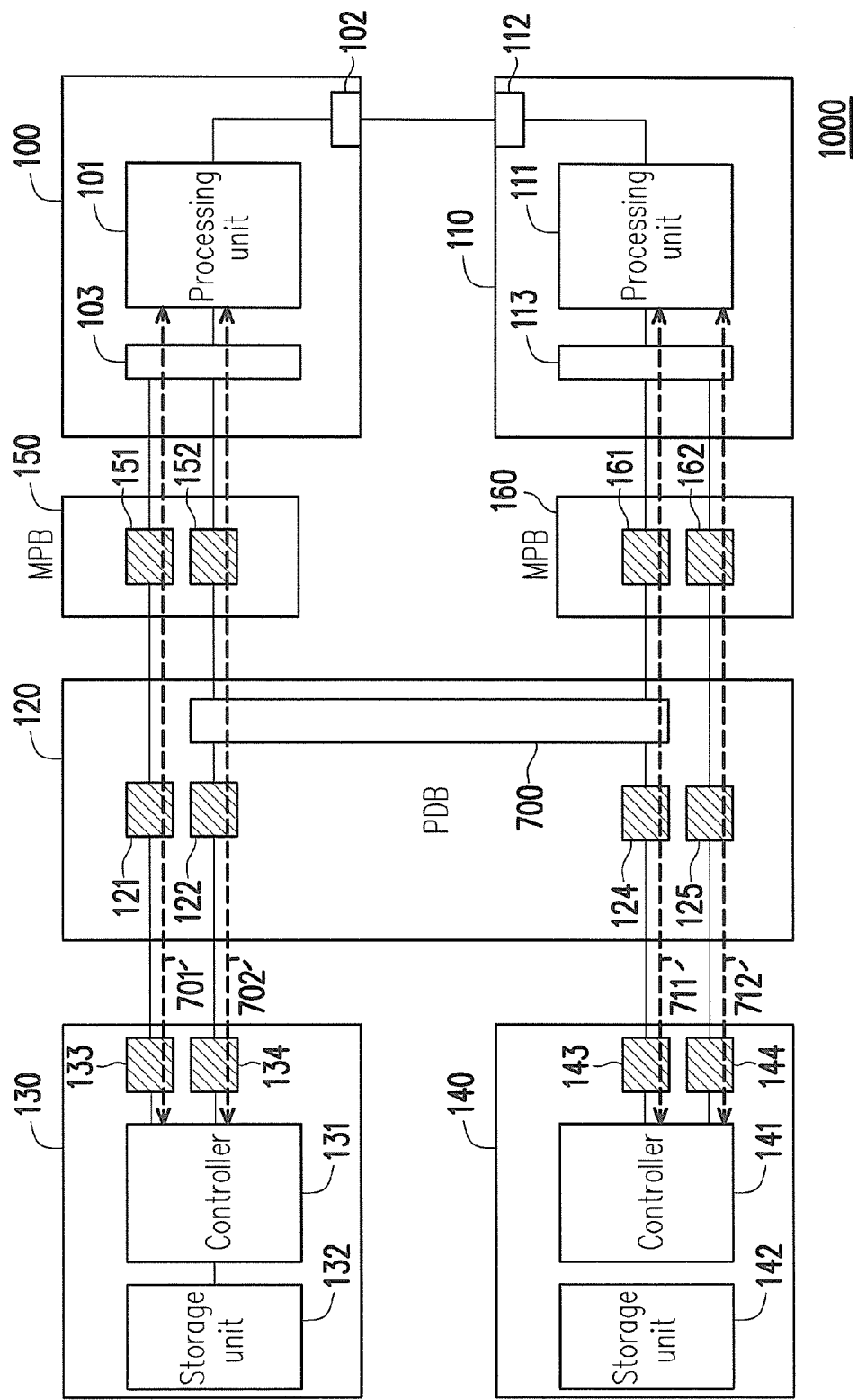
FIG. 7 to FIG. 8 are schematics of a server system and a data access path thereof illustrated according to another exemplary embodiment.
Figure 8:
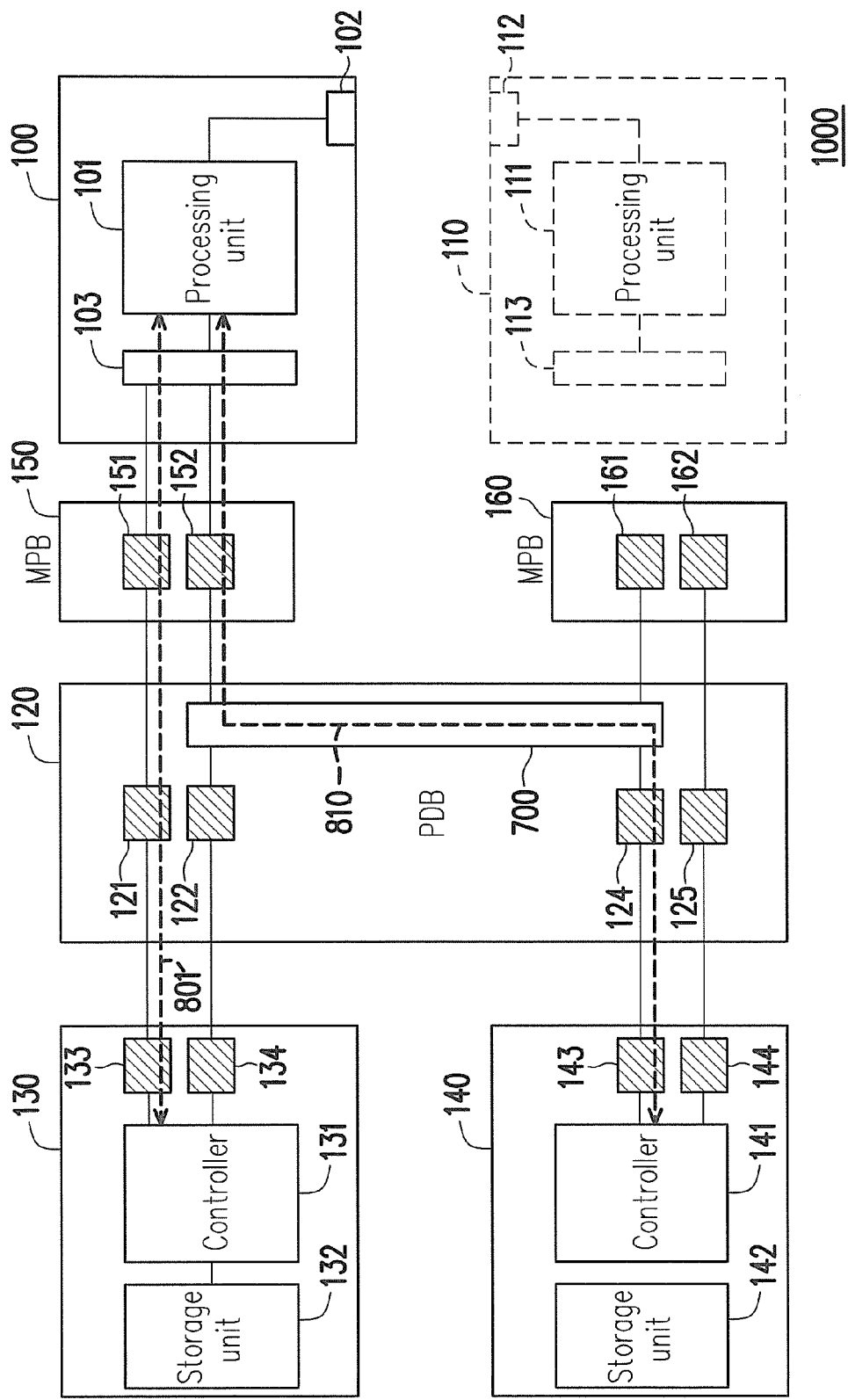

FIG. 7 to FIG. 8 are schematics of a server system and a data access path thereof illustrated according to another exemplary embodiment. Since FIG. 7 and FIG. 8 are based on the devices of the server system 1000 of FIG. 5, the function of each same device in FIG. 5 and FIG. 6 is not repeated herein. Moreover, the main difference between FIG. 7, FIG. 8 and FIG. 5, FIG. 6 is that the PDB module 120 of FIG. 7 and FIG. 8 has a switching module 700, and the PDB module 120 does not have the connection interface unit 123 and the MPB module 150 does not have the connection interface unit 153. The switching module 700, as shown in FIG. 7, is coupled to the connection interface units 122 and 124, and the switching module 700 is connected to the connection interface units 152 and 161. The switching module 700 is mainly configured to receive a switching command from the computing module 100, and the switching module 700 switches the connection relationship between the connection interface units of the storage apparatuses 130 and 140, the PDB module 120, and the MPB modules 150 and 160 according to the command.

The functions of the switching module 700 are described in detail in the following embodiments.

Referring to FIG. 7 and FIG. 8, in FIG. 7 and FIG. 8, the connection relationship between the computing module 100, the PDB module 120, the storage apparatus 130, the storage apparatus 140, the MPB module 150, and the MPB module 160 is the same and fixed, and the fixed connection relationship does not change with whether the computing module 110 is present. Specifically, as shown in FIG. 7 and FIG. 8, the fixed connection relationship includes that the connection interface unit 121 is connected to the connection interface unit 151 and the connection interface unit 133; the connection interface unit 122 is coupled to the switching module 700 and connected to the connection interface unit 134; the connection interface unit 124 is coupled to the switching module 700 and connected to the connection interface unit 143; the connection interface unit 125 is connected to the connection interface units 144 and 162; and the switching module 700 is connected to the connection interface units 152 and 161.

Moreover, in the example of FIG. 7, the computing module 100 is connected to the PDB module 120 via the MPB module 150. That is, the connection interface units 151 and 152 are connected to the connection interface unit 103. Moreover, the computing module 110 is connected to the PDB module 120 via the MPB module 160. That is, the connection interface units 161 and 162 are connected to the connection interface unit 113. At the same time, the communication unit 102 of the computing module 100 is connected to the communication unit 112 of the computing module 110.

Since in the example of FIG. 7, the computing module 110 connected to the PDB module 120 is present, the computing module 100 determines the computing module 110 connected to the PDB module 120 is present. Then, the computing module 100, as described above, issues a control command to the storage apparatuses 130 and 140 to respectively distribute the storage apparatus 130 and the storage apparatus 140 to the computing module 100 and the computing module 110. Moreover, the computing module 100 sends a switching command to the switching module 700, wherein the switching command instructs the switching module 700 to open the connection between the connection interface unit 122 and the connection interface unit 152, open the connection between the connection interface unit 124 and the connection interface unit 161, and break the connection between the connection interface unit 124 and the connection interface unit 152. Therefore, the computing module 100 establishes data paths 701, 702, 711, and 712 as shown in FIG. 7.

Referring to FIG. 8, since in the example of FIG. 8, the computing module 110 connected to the PDB module 120 is not present, the computing module 100 deteimines the computing module 110 connected to the PDB module 120 is not present. Then, the computing module 100, as described above, issues a control command to the storage apparatuses 130 and 140 to distribute the storage apparatus 130 and the storage apparatus 140 to the computing module 100. Moreover, the computing module 100 sends another switching command to the switching module 700, wherein the switching command instructs the switching module 700 to break the connection between the connection interface unit 122 and the connection interface unit 152, break the connection between the connection interface unit 124 and the connection interface unit 161, and open the connection between the connection interface unit 124 and the connection interface unit 152. Therefore, the computing module 100 establishes data paths 801 and 810 as shown in FIG. 8.

In other words, the computing module 100 decides how to control the switching module 700 in the PDB module 120 according to whether the computing module 110 connected to the PDB module 120 is present, thereby achieving the efficacy of automatic distribution of the storage apparatuses 130 and 140. In other words, the server system 1000 of FIG. 7 and FIG. 8 does not need to be switched (distribute storage apparatuses 130 and 140) by manually pre-adjusting the connection method of the cable before booting (such as the embodiments shown in FIG. 5 and FIG. 6).

In another exemplary embodiment, the user can further install or remove the computing module 110 by using the server system 1000 shown in FIG. 7 and FIG. 8 via a method of hot swap, thereby switching the server system 1000. For instance, in FIG. 8, in the case that the user inserts the computing module 110 to the MPB module 160 and connects the communication unit 102 and the communication unit 112, the computing module 100 determines that the computing module 110 connected to the PDB module 120 is present, and thereby automatically switches the data paths 801 and 810 of FIG. 8 to the data paths 701, 702, 711, and 712 of FIG. 7 by controlling the switching module 700. In contrast, in FIG. 7, in the case that the user removes the computing module 110 from the MPB module 160, the computing module 100 determines that the computing module 110 connected to the PDB module 120 is not present, and thereby automatically switches the data paths 701, 702, 711, and 712 of FIG. 7 to the data paths 801 and 810 of FIG. 8 by controlling the switching module 700.

It should be mentioned that, when the computing module 100 controls the PDB module 120 to distribute the storage apparatus 130 to the computing module 100 and distribute the storage apparatus 140 to the computing module 110, the computing module 100 transmits an idle control command to the storage apparatus 130 and the storage apparatus 140 via the control path 400, wherein the idle control command instructs the controllers 131 and 141 to make the storage apparatuses 130 and 140 operate in an idle mode. When the computing module 100 controls the PDB module 120 to distribute the storage apparatuses 130 and 140 to the computing module 100, the computing module 100 transmits a standby control command to the storage apparatus 130 and the storage apparatus 140 via the control path 400, wherein the standby control command instructs the controller 131 to make one storage medium (also referred to as first storage medium) in the storage apparatus 130 operate in the idle mode and make other storage media in the storage apparatus 130 operate in a standby mode. Similarly, the standby control command also instructs the controller 141 to make one storage medium (also referred to as second storage medium) in the storage apparatus 140 operate in the idle mode and make other storage media in the storage apparatus 140 operate in the standby mode.

In the present exemplary embodiment, a storage medium (such as a hard disk) operates in three modes, including: a normal mode, an idle mode, and a standby mode. For instance, in the case that the storage medium is a hard disk and when the hard disk operates in the normal mode, the rotational speed of the hard disk is normal rotational speed (such as 5400 RPM) (or maximum rotational speed), and the hard disk can perform normal (high-speed) data access operation. Moreover, when the hard disk does not access data for a period of time or when the hard disk receives a control command to enter the idle mode, the hard disk operates in the idle mode. The rotational speed of the hard disk operating in the idle mode is reduced (such as 2400 RPM) and the hard disk can execute a small amount (low-speed) of data access (reading operation such as reading directory information . . . etc. having small data volume). As a result, power consumption can be saved. Moreover, when the hard disk receives a control command to enter the standby mode, the rotational speed of the hard disk is reduced to zero (stops rotating), and data access cannot be performed and only the most basic power consumption is maintained (for instance, only power consumption needed for a control chip in the hard disk is maintained). As a result, power consumption caused by the rotation of the hard disk can be significantly saved. In other words, the power consumption of the hard disk operating in the standby mode is less than the power consumption of the hard disk operating in the idle mode (also less than the power consumption of the hard disk operating in normal mode).

When the hard disk operates in the standby mode, the storage media cannot perform high-speed data access. The hard disk operating in the standby mode needs to receive a control command instructing the hard disk to operate in the non al mode in order to switch the mode of operation of the hard disk to the normal mode, and thereby execute access operation of data. In general, the action in which the hard disk is switched from the standby mode (or idle mode) to the normal mode is also referred to as "waken."

Moreover, the first storage medium is configured to store the directory information of the data of the first storage apparatus 130. The controller 130 can obtain the physical address and the corresponding logical address of each storage medium according to the directory information. Accordingly, when the computing module 100 issues a command to access the storage medium in the standby/idle mode, the controller 130 can find the physical address of the storage medium according to the directory information and switch the storage medium in the standby/idle mode to the normal mode, and thereby control the storage medium to execute normal access of data.

It should be mentioned that, as described above, when the computing module 100 determines the computing module 110 connected to the PDB module 120 is not present, the computing module 100 controls the PDB module 120 to distribute the storage apparatuses 130 and 140 to the computing module 100 and transmit a standby control command to the storage apparatuses 130 and 140, wherein the standby control command instructs the controllers 131 and 141 to make one storage medium (also referred to as first storage medium) in the storage apparatuses 130 and 140 operate in the idle mode and make other storage media in the storage apparatuses 130 and 140 operate in the standby mode. Here, since most of the storage media of the storage apparatuses 130 and 140 operate in the standby mode, the overall power consumption of the storage apparatuses 130 and 140 is very low, thereby achieving the efficacy of power-saving. In contrast, when the computing module 100 determines the computing module 110 connected to the PDB module 120 is present, the computing module 100 controls the PDB module 120 to respectively distribute the storage apparatuses 130 and 140 to the computing modules 100 and 110, and transmits an idle control command to the storage apparatuses 130 and 140 such that the storage media of the storage apparatuses 130 and 140 all operate in the idle mode.

In other words, the overall power consumption of the server system 1000 (as shown in FIG. 5 and FIG. 7) of the storage apparatuses 130 and 140 operating in the idle mode is higher than the overall power consumption of the server system 1000 (as shown in FIG. 6 and FIG. 8) of the storage apparatuses 130 and 140 for which most storage media operate in the standby mode. Therefore, when only the computing module 100 of the server system 1000 is connected to the PDB module 120, the power consumption of the server system 1000 under such case is greater than that of the server system 1000 for which both the computing modules 100 and 110 are connected to the PDB module 120.

It should be mentioned that, in the present exemplary embodiment, the server system 1000 shown in FIG. 5 and FIG. 7 can also be referred to as a hot storage server system. As described above, each storage apparatus of the hot storage server system transmits data between the corresponding computing module by using two channels, thereby increasing the amount of data transmission. In contrast, the server system 1000 shown in FIG. 5 and FIG. 7 can also be referred to as a cold storage server system. Moreover, since each storage apparatus of the cold storage server system transmits data between the corresponding (main) computing module by using one channel, the amount of data transmission of the cold storage server system is lower than the amount of data transmission of the hot storage server system.

Figure 9:
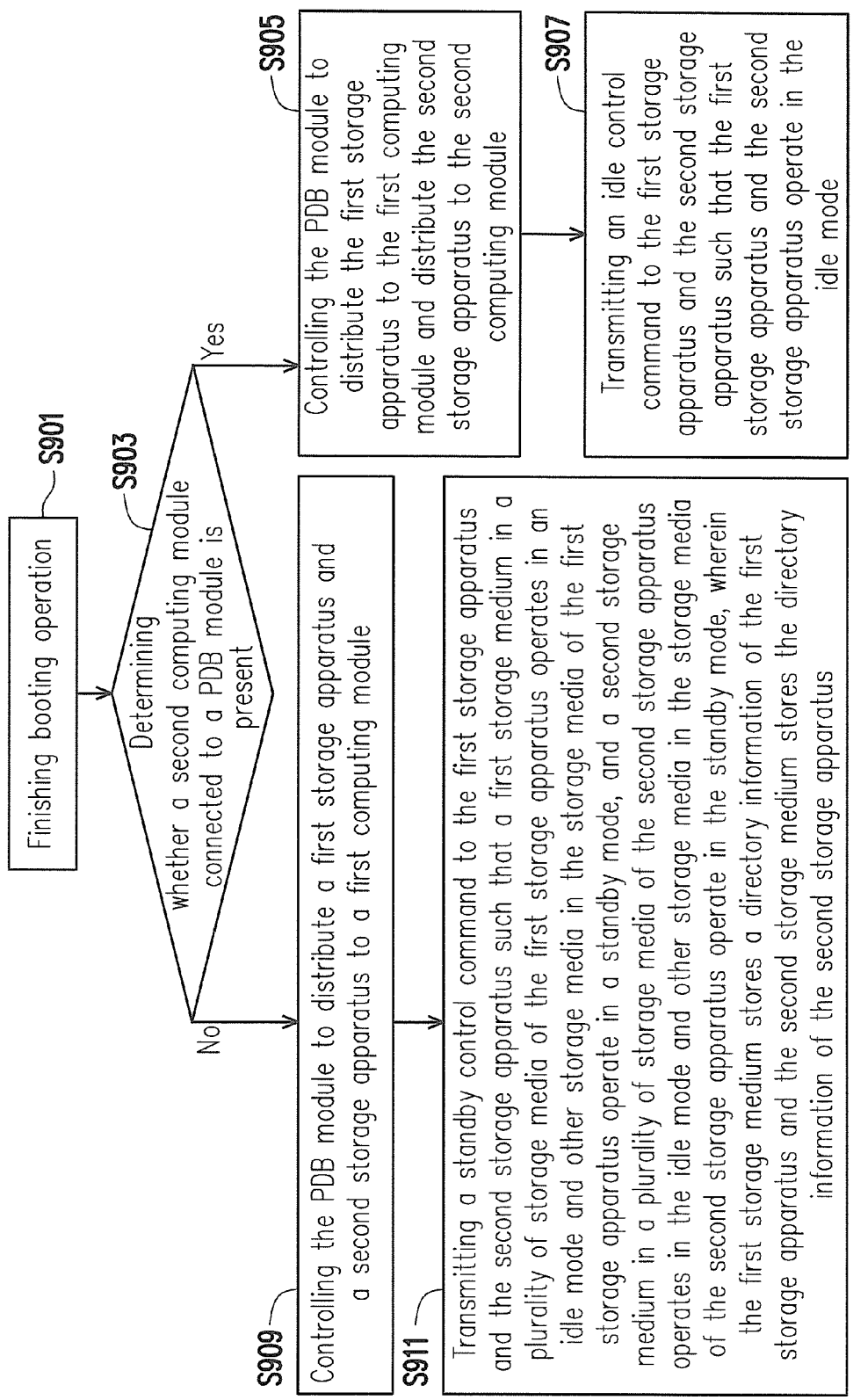
FIG. 9 is a flowchart of a control method illustrated according to another exemplary embodiment.

FIG. 9 is a flowchart of a control method of a server system illustrated according to another exemplary embodiment. Referring to FIG. 1 and FIG. 9, in step S901, the computing module 100 (hereinafter first computing module 100) finishes a booting operation, then in step S903, the first computing module 100 determines whether the second computing module 110 connected to the PDB module 120 is present.

In the case that the first computing module 100 determines the second computing module 110 connected to the PDB module 120 is present in step S903, step S905 is performed, in which the computing module 100 controls the PDB module 120 to distribute the first storage apparatus 130 to the first computing module 100 and distribute the second storage apparatus 140 to the second computing module 110. Then, in step 5907, the computing module 100 transmits an idle control command to the first storage apparatus 130 and the second storage apparatus 140 such that the first storage apparatus 130 and the second storage apparatus 140 operate in an idle mode.

In the case that the first computing module 100 determines the second computing module 110 connected to the PDB module 120 is not present in step S903, step 5909 is performed, in which the first computing module 100 controls the PDB module 120 to distribute the first storage apparatus 130 and the second storage apparatus 140 to the first computing module 100. Then, in step S911, the first computing module 100 transmits a standby control command to the first storage apparatus 130 and the second storage apparatus 140 such that the first storage medium in a plurality of storage media of the first storage apparatus 130 operates in an idle mode and other storage media in the storage media of the first storage apparatus 130 operate in a standby mode, and the second storage medium in a plurality of storage media of the second storage apparatus 140 operates in the idle mode and other storage media in the storage media of the second storage apparatus 140 operate in the standby mode, wherein the first storage medium stores the directory information of the first storage apparatus 130 and the second storage medium stores the directory information of the second storage apparatus 140.

Based on the above, the server system and the control method for the server system provided in the invention do not need the use of two PDB modules to support two storage applications of the server system. Moreover, the server system and the control method for the server system can achieve different data access applications in the server system by only using a general-purpose PDB module, thereby saving the design, materials, and assembly cost related to the PDB module in the server system.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A server system, comprising:
a first computing module, comprising a processing unit;
a power distribution board (PDB) module connected to the first computing module and configured to distribute a power of the server system;
a first storage apparatus connected to the PDB module; and
a second storage apparatus connected to the PDB module,
wherein after finishing a boot operation, the first computing module determines whether a second computing module connected to the PDB module is present, such that the first computing module controls the PDB module to select and distribute the first storage apparatus and the second storage apparatus to the first computing module and the second computing module.

2. The server system of claim 1, wherein the first computing module determines whether the second computing module connected to the PDB module is present;
in the case that the second computing module connected to the PDB module is present, the first computing module is further configured to control the PDB module to distribute the first storage apparatus to the first computing module and distribute the second storage apparatus to the second computing module; and
in the case that the second computing module connected to the PDB module is not present, the first computing module is further configured to control the PDB module to distribute the first storage apparatus and the second storage apparatus to the first computing module.

3. The server system of claim 2, wherein when the first storage apparatus is distributed to the first computing module and the second storage apparatus is distributed to the second computing module, the first computing module transmits an idle control command to the first storage apparatus such that the first storage apparatus operates in an idle mode, and the second computing module transmits the idle control command to the second storage apparatus such that the second storage apparatus operates in the idle mode.

4. The server system of claim 2, wherein the first storage apparatus and the second storage apparatus respectively have a plurality of storage media; and
when the first storage apparatus and the second storage apparatus are distributed to the first computing module, the first computing module transmits a standby control command to the first storage apparatus and the second storage apparatus such that a first storage medium in the storage media of the first storage apparatus operates in an idle mode and other storage media in the storage media of the first storage apparatus operate in a standby mode, and a second storage medium in the storage media of the second storage apparatus operates in the idle mode and other storage media in the storage media of the second storage apparatus operate in the standby mode,
wherein the first storage medium stores a directory information of the first storage apparatus and the second storage medium stores a directory information of the second storage apparatus,
wherein a power consumption of a storage medium operating in the standby mode is lower than a power consumption of the storage medium operating in the idle mode.

5. The server system of claim 1, wherein the PDB module is connected to the first computing module via a first midplane board (MPB) module and the PDB module is connected to the second computing module via a second MPB module.

6. A control method of a server system, configured for a server system having a first storage apparatus, a second storage apparatus, a PDB module, and a first computing module, the method comprising:
   determining whether a second computing module connected to the PDB module is present when the first computing module finishes a boot operation; and
   controlling the PDB module to select and distribute the first storage apparatus and the second storage apparatus to the first computing module and the second computing module according to a result of determining whether the second computing module connected to the PDB module is present.

7. The control method of claim 6, wherein the step of determining whether the second computing module connected to the PDB module is present comprises:
   controlling the PDB module to distribute the first storage apparatus to the first computing module and distribute the second storage apparatus to the second computing module in the case that the second computing module connected to the PDB module is present; and
   controlling the PDB module to distribute the first storage apparatus and the second storage apparatus to the first computing module in the case that the second computing module connected to the PDB module is not present.

8. The control method of claim 6, further comprising the following steps after the first storage apparatus is distributed to the first computing module and the second storage apparatus is distributed to the second computing module:
   transmitting an idle control command to the first storage apparatus and the second storage apparatus such that the first storage apparatus and the second storage apparatus operate in an idle mode.

9. The control method of claim 6, wherein the first storage apparatus and the second storage apparatus respectively have a plurality of storage media, and
   further comprising the following steps after the first storage apparatus and the second storage apparatus are distributed to the first computing module:
   transmitting a standby control command to the first storage apparatus and the second storage apparatus such that a first storage medium in the storage media of the first storage apparatus operates in an idle mode and other storage media in the storage media of the first storage apparatus operate in a standby mode, and a second storage medium in the storage media of the second storage apparatus operates in the idle mode and other storage media in the storage media of the second storage apparatus operate in the standby mode.

10. The control method of claim 9, wherein the first storage medium stores a directory information of the first storage apparatus and the second storage medium stores the directory information of the second storage apparatus,
    wherein a power consumption of a storage medium operating in the standby mode is lower than the power consumption of the storage medium operating in the idle mode.

* * * * *